US012309160B2

(12) United States Patent
Varada et al.

(10) Patent No.: US 12,309,160 B2
(45) Date of Patent: May 20, 2025

(54) VIRTUAL REALITY ENABLED INTERNET-OF-THINGS DEVICE RESOLUTION

(71) Applicant: International Business Machines Corporation, Armonk, NY (US)

(72) Inventors: Sri Harsha Varada, Vizianagaram (IN); Pavan Kumar Penugonda, Anakapalle (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 17/555,479

(22) Filed: Dec. 19, 2021

(65) Prior Publication Data
US 2023/0198994 A1 Jun. 22, 2023

(51) Int. Cl.
*H04L 9/40* (2022.01)
*G10L 15/22* (2006.01)
(Continued)

(52) U.S. Cl.
CPC .......... *H04L 63/105* (2013.01); *H04L 67/131* (2022.05); *G10L 15/22* (2013.01); *G16Y 10/75* (2020.01)

(58) Field of Classification Search
CPC ... H04L 63/105; H04L 63/102; H04L 67/131; H04L 67/38; G10L 15/22; G16Y 10/75
See application file for complete search history.

(56) References Cited

U.S. PATENT DOCUMENTS

2014/0244834 A1* 8/2014 Guedalia ................. H04W 4/08
709/224
2018/0351961 A1* 12/2018 Calcaterra ............. H04L 63/105
(Continued)

FOREIGN PATENT DOCUMENTS

KR 102031670 B1 10/2019

OTHER PUBLICATIONS

"Holistic AI Models to Augment Mentor-Student Matching and Build Long-Term Rapport", An IP.com Prior Art Database Technical Disclosure, Disclosed Anonymously, IP.com No. IPCOM000259967D, IP.com Electronic Publication Date: Oct. 4, 2019, 5 pages.
(Continued)

*Primary Examiner* — Farid Homayounmehr
*Assistant Examiner* — Brian William Avery
(74) *Attorney, Agent, or Firm* — Anthony Mauricio Pallone; Andrew D. Wright; Calderon Safran & Wright P.C.

(57) ABSTRACT

VR enabled IoT device resolution methods are described for receiving user request data (URD) corresponding to a user request comprising a natural language utterance (NLU) to resolve a problem with IoT devices in a user IoT environment from a first user device (UD), determining a problem identifier based on the NLU, determining access restrictions based on the URD, identifying resolution personnel based on the problem identifier, transmitting resolution personnel data comprising a prompt to receive user authorization to access the user IoT environment to the first UD, receiving user authorization data; establishing a remote access session (RAS) between the first UD and a second UD granting the resolution personnel access to the user IoT environment, transmitting rendering instructions to the second UD causing the second UD to render a VR environment in a second UD user interface based on the user IoT environment, the IoT devices, and the access restrictions.

20 Claims, 6 Drawing Sheets

(51) Int. Cl.
 *G16Y 10/75* (2020.01)
 *H04L 67/131* (2022.01)

(56) References Cited

U.S. PATENT DOCUMENTS

| | | | |
|---|---|---|---|
| 2019/0325660 A1 | 10/2019 | Schmirler | |
| 2020/0227026 A1* | 7/2020 | Rajagopal | G06F 16/244 |
| 2020/0252302 A1 | 8/2020 | Lairsey | |
| 2022/0076455 A1* | 3/2022 | Tucker | G06K 7/1417 |
| 2022/0350401 A1* | 11/2022 | Gutensohn | G06F 3/011 |

OTHER PUBLICATIONS

"How to Provide Secure Remote Access to IoT Edge Devices via Web, SSH and Remote Desktop", Macchina.io white papers, Printed Dec. 1, 2021, 4 pages, <https://macchina.io/downloads/RemoteManagerWhitePaper.pdf>.

"IoT meets Augmented Reality", Device Insight, Printed Dec. 1, 2021, 9 pages, <https://www.device-insight.com/en/remote-service-augmented reality/>.

"Multi-system Collaboration: How VR remote collaboration facilitates product reviews from a distance", TechViz, Printed Dec. 1, 2021, 7 pages, <https://www.techviz.net/en/vr-collaboration>.

"Reduce downtime with smart ticketing and IOT predictive maintenance", SnapSupport product page, Printed Dec. 1, 2021, 6 pages, <https://snapsupport.io/iot-predictive-maintenance-support.html>.

"Using AR/VR to transform aircraft maintenance and repair", YouTube, Jul. 2, 2017, Printed Dec. 1, 2021, 3 pages, <https://www.youtube.com/watch?app=desktop&v=vRBlAaztdVQ>.

Mell et al., "The NIST Definition of Cloud Computing", National Institute of Standards and Technology, Special Publication 800-145, Sep. 2011, 7 pages.

Puri et al., "The Internet of Things, Augmented Reality and Virtual Reality: A Fruitful Synergy in Industry 4.0", ElectronicForu.com, Jan. 8, 2019, 10 pages, <https://www.electronicsforu.com/technology-trends/tech-focus/iot-ar-vr-fruitful-synergy-industry-4>.

* cited by examiner

VIRTUAL REALITY ENABLED INTERNET-OF-THINGS DEVICE RESOLUTION

BACKGROUND

The present invention relates generally to the field of remote troubleshooting computing devices, and more particularly to virtual reality (VR) enabled Internet-of-Things (IoT) device resolution.

Interacting within a combined VR and IoT environment can be achieved using head mounted displays and other IoT devices and can be used in a broadening array of applications. The combination of VR and IoT technologies has brought a great shift in the technology stack to solve problems at a pace that is unprecedented. A user equipped with a wearable VR device may be visually immersed in a VR world or a VR environment that is completely virtual or a combination of virtual and physical. Many IoT environments are exposed in VR view where a user can practically experience an IoT environment without being physically available at the place. IoT/VR devices and environments are applied in work, shopping, gaming, virtual travel, and other forms of entertainment, etc. While using a VR device to access a specific VR environment, a user is partially or completely disconnected from the physical world. Also, in most cases, the user is completely disconnected from other VR environments that the user may have access to at other times. As the user navigates through a VR environment, various VR features may be available or not available.

SUMMARY

Embodiments of the present invention disclose a computer-implemented method, a computer program product, and a computer system for virtual reality (VR) enabled Internet-of-Things (IoT) device resolution. The computer-implemented method for VR enabled IoT device resolution may include one or more processors configured for receiving user request data from a first user device, the user request data corresponding to a user request comprising a natural language utterance. Further, the computer-implemented method may be configured for determining a problem identifier corresponding to the problem based on the natural language utterance, determining access restrictions corresponding to the user IoT environment based on the user request data, identifying resolution personnel based on the problem identifier, and transmitting resolution personnel data to the first user device, the resolution personnel data comprising a user prompt to receive user authorization for the resolution personnel to access the user IoT environment via a second user device. Further, the computer-implemented method may be configured for receiving user authorization data comprising the user authorization, establishing a remote access session between the first user device and a second user device granting the resolution personnel access to the user IoT environment based on the access restrictions, transmitting rendering instructions to the second user device causing the second user device to render a VR environment in a user interface of the second user device based on the user IoT environment, the one or more IoT devices, and the access restrictions.

DETAILED DESCRIPTION

Figure 1:
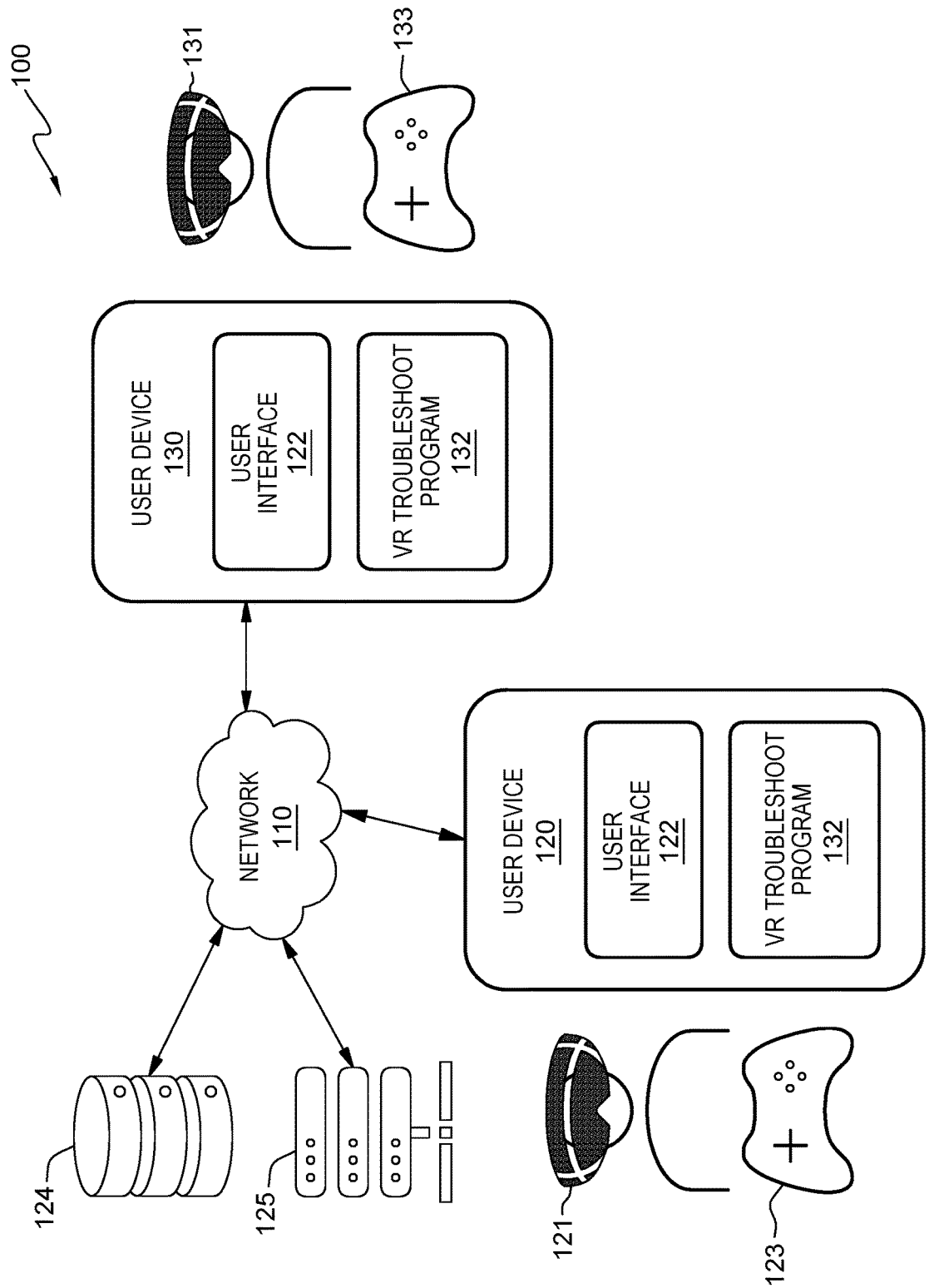
FIG. 1 depicts a functional block diagram illustrating a distributed data processing environment for virtual reality (VR) enabled Internet-of-Things (IoT) device resolution, in accordance with an embodiment of the present invention.

Embodiments of the present invention recognize that some aspects of performing a diagnostic exercise to troubleshoot a problem may require a service technician to be physically present in the physical environment. However, access to physical environments is becoming more and more resource intensive due to the time required and the safety precautions that must be in place to maintain safe home and leisure environments.

As VR usage is increasing, the ability to control IoT devices with in the virtual reality (VR) world is also rapidly increasing. The chances of getting intruders stealing/compromising the IoT systems also increases with the evolved technology. To protect our interconnected systems from security lapses, embodiments described herein provide restrictions to contextually disable/enable access at device level or device sub component level, thereby increasing security to those systems. There are numerous IoT devices that are being installed in home and work environments, and varying types introduced, every day. For example, a car may have many IoT devices integrated into it and when a user faces a problem, the user may like to hire a technician to obtain a resolution. While the resolution is happening there should be an ability for the user to not give entire access to the technician to all IoT's integrated within the user environment. However, when there is a need for access to a component part of the car, partial IoT access may be provided to the technician instead of providing full unrestricted access.

The embodiments described herein provide computer-implemented methods, computer systems, and computer program products by which a user wearing a virtual reality headset can request a resolution to a problem in an IoT system in a physical environment by granting access to a technician using VR environments rendered based on the physical environment.

Embodiments of the present invention recognize that user may desire the ability to have access to a system that can automatically identify and choose, or allow the user to choose, the best technician for a problem in an IoT system using VR view assistance. Further, embodiments described herein recognize that users may not want to grant full access to the entire IoT system when the technician may only need access to certain aspects of the IoT system. Thus, embodiments described herein may be configured to grant restricted or minimum required access to IoT devices within the IoT system or IoT environment, which may be accessible from within the VR environment to allow the troubleshooting technician/assistant restricted access.

Embodiments described herein include a contextually driven collaboration enabled VR and IoT environment with security access restricted techniques for sharing the VR boundary and associated components and devices partially, fully, or based on a pre-defined rule set by an enterprise or by individual users. For example, if a user deploys an IoT enabled data centre or IoT data environment and the user experiences a network glitch for which the user wants to troubleshoot with a third-party support technician, then embodiments described herein may be configured to allow the support technician to join a VR view of the IOT enabled data centre to identify, correct, and/or guide the user on how to address the problem. However, embodiments described herein may also be configured to ensure that not the entire IoT enabled data centre is accessible to the support technician, wherein access to the IoT enabled data centre may be determined contextually based on need and only access to the required portion of the IoT enabled data centre should be granted to the support technician.

Embodiments described herein may be configured to receive user input corresponding to a natural language utterance describing the problem, wherein embodiments described herein may be configured to dynamically identify the problem, locate the IoT device experiencing the problem, and display the problem and associated images to the user via a user interface of the VR headset computing device. Further, embodiments described herein may be configured to identify the problem by performing a query a library of images and/or videos relevant to the IoT devices based on the user input (e.g., natural language utterance, image/video uploads) describing the problem or receive IoT feeds (e.g., transmitting IoT image/video data) from the user describing the problem. Further, embodiments described herein may be configured to determine the appropriate resolution personnel with the capabilities to resolve the problem and selectively allow or disallow the resolution personnel based on user authorizations and access restrictions.

Embodiments described herein may include a VR headset and accompanying controllers configured to be worn by the user to interact with the VR environment. For example, embodiments described herein may be configured to receive user input data corresponding to a boundary range selection by the user, wherein the user may make body gestures (e.g., head gestures with VR headset, hand gestures with VR controller) to define an approved list of IoT devices within the IoT environment that are visible to the user, wherein the approved list is the list of IoT devices that the resolution personnel are authorized to access.

Embodiments described herein may include image-based security repositories hosted in a cloud-computing database, wherein the image-based security repositories may be created by certified authorities. Further, embodiments described herein may be configured to allow security access of IoT devices connected within the IoT environment for each problem identified by a user. Further, the image-based security repositories may be leveraged by end-users with seamless self-calibration and mapping from the IoT environment. For example, each time an IoT device experiences a problem, embodiments described herein may be configured to self-calibrate and determine a problem identifier using an image hosted within the image-based security repositories to determine the required restricted security access for the IoT device. Once the restricted security access is determined, such security access may be applied to the resolution personnel identified to perform the troubleshooting for the problem in the VR environment.

Embodiments described herein may be configured to only allow the resolution personnel access to the VR environment and/or IoT environment according to the restricted security access and no other access to the VR environment and/or IoT environment may be allowed. For example, if the IoT environment includes a self-driving vehicle and a lane-assist problem is identified, then embodiments described herein may be configured to allow restricted security access only to the lane assist aspect of the self-driving vehicle so that the resolution personnel may not access other aspects or controls of the self-driving vehicle. Further, for example, the resolution personnel may perform troubleshooting techniques by only reading IoT parameters corresponding to the lane-assist features of the self-driving vehicle to resolve the problem.

Embodiments described herein may be configured to associate image data that was provided to determine the problem with the troubleshooting techniques employed to resolve the problem, wherein the image data may be saved with data as an image profile corresponding to the IoT device and the associated restricted security access for future reference. In other words, the user may be configured to input user defined data corresponding to a request to define the image-based security repository based on data exchanged during the troubleshooting experience with the resolution personnel, wherein the image-based security repository may be made publicly available or shared with other users for their use (e.g., to resolve an identical problem, determine context to resolve a similar problem).

Embodiments described herein may be configured to learn different components and associated problems over time by response analysis of an IoT feed and the sequential steps performed to resolve the identified problem. Further, embodiments described herein may be configured to generate a worksheet summary and automatically process approvals needed to perform the troubleshooting techniques from the resolution personnel.

Embodiments described herein may be configured to identify resolution personnel including a plurality of technicians having an inter-dependency that may be needed to resolve the problem in parallel or sequentially with each other, wherein role-based restrictions may be applied to each of the plurality of technicians based on the corresponding aspect of the problem. For example, embodiments described herein may be configured for assigning a first technician to a first aspect of the problem and assigning a second technician to a second aspect of the problem. Further, embodiments described herein may be configured to dynamically enable or disable the role-based restrictions based on determining whether other technician associated pre-requisites are fulfilled.

Implementation of embodiments of the invention may take a variety of forms, and exemplary implementation details are discussed subsequently with reference to the Figures.

FIG. 1 depicts a functional block diagram illustrating a distributed data processing environment for Virtual Reality (VR) enabled Internet-of-Things (IoT) device resolution, generally designated 100, in accordance with one embodiment of the present invention. The term "distributed" as used herein describes a computer system that includes multiple, physically distinct devices that operate together as a single computer system.

FIG. 1 provides only an illustration of one embodiment of the present invention and does not imply any limitations with regard to the environments in which different embodiments may be implemented. As shown in FIG. 1, the distributed data processing environment 100 for VR enabled IoT device resolution includes network 110 configured to facilitate communication between database 124, server 125, first user device 120, and second user device 130.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between database 124, server 125, first user device 120, and second user device 130. It is further understood that in some embodiments network 110 is optional and the distributed data processing environment 100 for synchronizing notifications across virtual reality environments and physical environments can operate as a stand-alone system, where in other embodiments, network 110 may be configured to enable first user device 120, and second user device 130 to share a joint database using network 110.

User device 120 may be identical to user device 130, which may be an electronic device configured for accompaniment with a user. User device 120 may be different from user device 130, wherein user device 120 may be an electronic device configured for accompaniment with a consumer user (e.g., customer) and user device 130 may be an electronic device configured for accompaniment with an agent user (e.g., agent technician). User device 120 may be a personal electronic device such as a mobile communications device, smart phone, tablet, personal digital assistant, smart wearable device, virtual reality headset and accompanying controllers, personal laptop computer, desktop computer, or any other electronic device configured for user interaction and gathering user information to generate a user profile. In the depicted embodiment, user device 120 includes user interface 122 and sensor(s) (not shown). User device 120 may include components as described in further detail in FIG. 4.

User interface 122 operates as a local user interface on user device 120 through which one or more users of user device 120 interact with user device 120. In some embodiments, user interface 122 is a local app interface of a program (e.g., software configured to execute the steps of the invention described herein) on user device 120 or virtual reality headset 121. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from the program via network 110. In an embodiment, user interface 122 enables a user to send and receive data (i.e., to and from the program via network 110, respectively). In an embodiment, user interface 122 enables a user to opt-in to the program, input user related data, and receive alerts to complete a task or activity.

Virtual reality headset 121 (and virtual reality headset 131) may be an electronic device configured to be a component configured to provide access to a VR environment. The electronic device may include a wireless sensor, software, actuators, and computer devices. Virtual reality headset 121 may be controlled from a remotely controlled system via network 110 or locally controlled system via a local network, or a combination of both. Further, virtual reality headset 121 may be configured to be controlled via a software application installed and executed by virtual reality headset 121 or user device 120. Virtual reality headset 121, when connected to a network, may convey usage data and other types of data corresponding to the device itself, or other devices connected via network 110, wherein the data may provide insights that are useful within the scope of the designed application. Virtual reality headset 121 may be configured with a processor, memory, and peripherals (not shown) to receive and process data. Virtual reality headset 121 may include components as described in further detail in FIG. 4.

In some embodiments, the user may wear special gloves, and/or utilize handheld controllers (e.g., VR controller 123, VR controller 133) to perform operations in the VR environment in conjunction with VR headsets (e.g., virtual reality headset 121, virtual reality headset 131). Optionally, one or more wearable sensors may be utilized to obtain various data regarding the user as they operate within the virtual environment. This data can include, but is not limited to, positional data, biometric data, body gesture data and/or ambient environmental data.

Database 124 may operate as a repository for data associated with server 125, user device 120, user device 130, virtual reality headset 121, virtual reality headset 131, VR controller 123, VR controller 133, and other data transmitted within network 110. A database is an organized collection of data. Database 124 can be implemented with any type of storage device capable of storing data and configuration files that can be accessed and utilized by server 125, user device 120, virtual reality headset 121, VR controller 123, user device 130, virtual reality headset 131, and VR controller 133, such as a database server, a hard disk drive, or a flash memory. In an embodiment, database 124 may be accessed by server 125, user device 120, user device 130, virtual reality headset 121, virtual reality headset 131, VR controller 123, VR controller 133 to store data associated with user device 120, virtual reality headset 121, VR controller 123, user device 130, virtual reality headset 131, and VR controller 133. In another embodiment, database 124 may be accessed by user device 120, virtual reality headset 121, VR controller 123, user device 130, virtual reality headset 131, or VR controller 133 to access data as described herein. In an embodiment, database 124 may reside independent of network 110. In another embodiment, database 124 may reside elsewhere within distributed data processing environment 100 provided database 124 has access to network 110.

In the depicted embodiment, server 125 may contain VR troubleshoot program 132 configured to execute the steps of the invention described herein. In some embodiments, server 125 can be a standalone computing device(s), a management server(s), a web server(s), a mobile computing device(s), or any other electronic device(s) or computing system(s) capable of receiving, sending, and processing data. In some embodiments, server 125 may be a laptop computer, tablet computer, netbook computer, personal computer (PC), a desktop computer, a smart phone, or any programmable electronic device capable of communicating with user device 120, virtual reality headset 121, VR controller 123, user device 130, virtual reality headset 131, and VR controller 133 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 4.

Figure 2:
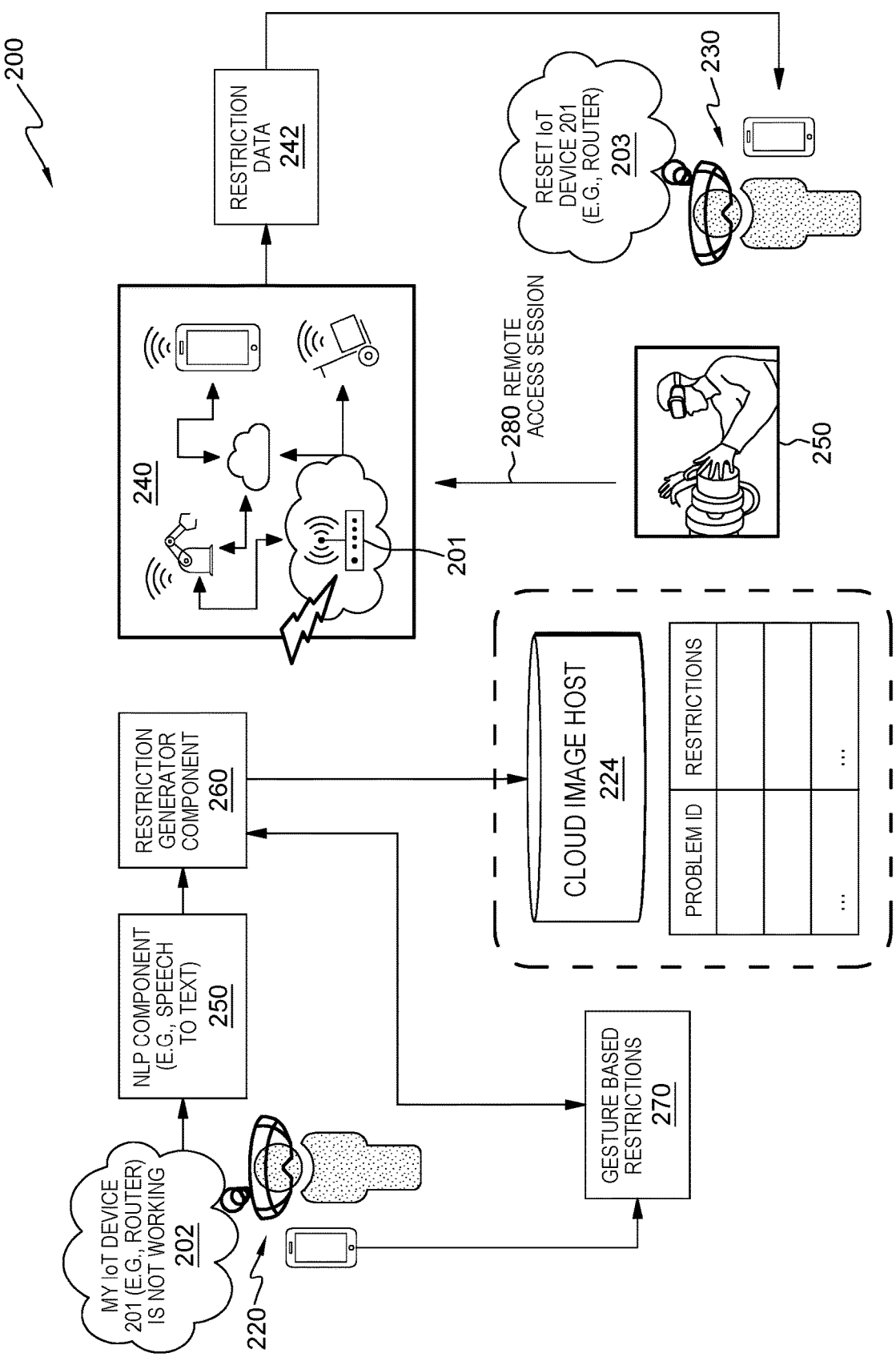
FIG. 2 depicts a diagram of a system for VR enabled IoT device resolution, in accordance with an embodiment of the present invention.

FIG. 2 depicts a diagram of a system 200 for virtual reality (VR) enabled Internet-of-Things (IoT) device resolution, in accordance with an embodiment of the present invention.

In an embodiment, system 200 may include first computing device 220 configured to receive user request data corresponding to a user request comprising a natural language utterance 202 (e.g., my IoT device is not working). Further, system 200 may include IoT system 240 comprising interconnected IoT devices (e.g., router) connected via an IoT enabled network.

In an embodiment, system 200 may include NLP component 250 configured to receive the user request data and convert natural language utterance 202 to text data to determine a problem identifier.

In an embodiment, NLP component 250 may include one or more processors configured to determining a problem identifier based on the natural language utterance 202. For example, NLP component 250 may include a machine learning model configured to receive model input data corresponding to the natural language utterance 202 and process the model input data to generate model output data corresponding to the problem identifier. In an embodiment, the machine learning model may be trained with input training data corresponding to natural language utterances describing a problem a user may report to a troubleshooting agency, wherein a problem type may be assigned to each of the natural language utterances in the input training data or at some point during the process of training the machine learning model. In an embodiment, the problem type may be assigned a problem identifier.

Further, NLP component 250 may be configured to transmit the text data to restriction generator component 260 to determine access restrictions corresponding to the user IoT environment (e.g., IoT system 240). For example, restriction generator component 260 may be configured to identify restriction levels for each IoT device in IoT system 240 based on the user request data (e.g., problem identifier) and generate the access restrictions based on the restriction levels and user authorization data including a user authorization received from first computing device 220.

In an embodiment, system 200 may include gesture-based restrictions component 270 configured to receive user input data corresponding to gestured indications of restricted access to one or more IoT devices within IoT system 240. For example, user may be wearing a VR headset device (e.g., first computing device 220) with accompanying VR controller while viewing a user interface generated in a display of the VR headset device. While wearing the VR headset device and/or holding the accompanying VR controller, the user may perform body movement gestures in response to a user prompt to define an approval list of IoT devices that the user wants to grant access to resolution personnel. For example, if the user makes body movement gestures in the direction of IoT device 201, then IoT device 201 may be included on the approval list of IoT devices that the user wants to grant access to resolution. Furthermore, the body movement gestures may be detected by the VR headset device and/or accompanying VR controller and transmitted to gesture-based restrictions component 270 to generate user boundary range data, wherein the user boundary range data may be based at least on one or more of the user request data and the user input data.

In an embodiment, restriction generator component 260 may be configured to create the required authorizations of the IoT devices with authorizations received from the user and assign the authorizations to resolution personnel. In an embodiment, restriction generator component 260 may be configured to receive user boundary data from gesture-based restrictions component 270, receive user input data from NLP component 250, and determine access restrictions corresponding to the user IoT environment (e.g., IoT system 240). For example, restriction generator component 260 may be configured for identifying restriction levels for each of the IoT devices based on the user request data and generate the access restrictions based on the restriction levels and the user authorization.

In an embodiment, restriction generator component 260 may be configured to create new image data corresponding to a predefined list of access for an IoT device and save the new image data to image-based security repositories hosted in a cloud-computing database. In an embodiment, once the restriction generator component 260 confirms the access control list, the restriction generator component 260 may be configured to generate a restriction data packet (e.g., restriction data 242) based on the access control list. Further, the restriction data packet may be made available to the resolution personnel upon accessing second computing device 230. Furthermore, the one or more processors may be configured for parsing the restriction data packet and grant access to the resolution personal based on the access control list represented in the restriction data packet. For example, restrictions may include multiple modes of access, including but not limited to read, write, or execute, which may be defined by the restriction generator component 260.

In an embodiment, identifying the restriction levels may include identifying the IoT device that has the problem based on the user request data or the user boundary data, determining a level of access required to resolve the problem, and receiving authorization from the user to access the IoT device at the required level of access. In an embodiment, one or more processors may be configured for generating restriction data 242 corresponding to the restriction levels granted by the user to the resolution personnel. Therefore, restriction generator component 260 may be configured to generate restriction data 242 corresponding to the access restrictions based at least on one or more of on the restriction level and the user authorization and transmit the restriction data 242 to the resolution personnel (e.g., second computing device 230).

In an embodiment, system 200 may include one or more processors configured for identifying resolution personnel based on the problem identifier. For example, if the problem identifier corresponds to a router (e.g., IoT device 201) having a problem with internet connectivity, then the one or more processors may be configured for identifying resolution personnel corresponding to an internet router technician associated with second computing device 230 having the capabilities of troubleshooting and resolving the internet connectivity problem.

In an embodiment, system 200 may include one or more processors configured for generating resolution personnel data comprising a user prompt to receive user authorization for the resolution personnel to access the IoT device in the IoT environment via second computing device 230 and transmitting the resolution personnel data to first computing device 220. For example, responsive to receive restriction data 242, the one or more processors may be configured to process the restriction data and determine the problem with the IoT device and generate resolution personnel data comprising the user prompt to be presented to the user of first computing device 220.

In an embodiment, system 200 may include one or more processors configured for generating the user prompt in a user interface of first computing device 220 and receive user authorization data comprising the user authorization. For example, the user prompt may be generated within the user interface of first computing device 220 and the user interface may be configured to receive the user authorization via one or more user input formats (e.g., voice utterance, text input, body gesture), wherein the user authorization may be transmitted to second computing device 230.

In an embodiment, responsive to receive the user authorization, system 200 may include one or more processors configured for establishing remote access session 280 between the first user device (e.g., first computing device 220) and the second user device (e.g., second computing device 230), wherein remote access session 280 may be configured to grant the resolution personnel (e.g., internet router technician) access to user IoT environment (e.g., IoT system 240) using second user device (e.g., second computing device 230) based on the access restrictions.

In an embodiment, system 200 may include one or more processors configured for transmitting rendering instructions to the second user device causing the second user device to render a remote Virtual Reality (VR) environment 290 in the user interface of the second user device (e.g., second computing device 230) based at least on one or more of the user IoT environment, the one or more IoT devices, and the access restrictions. For example, the user IoT environment may be mapped by first user device (e.g., first computing device 220) by capturing images of the physical environment proximate to physical components of IoT system 240, wherein mapping the user IoT environment may generate user IoT environment data. Further, IoT environment data may also include IoT device data corresponding to images, specifications, identifiers, status, or any other data pertaining to an IoT device. In an embodiment, the one or more processors may be configured to render the remote VR environment 290 in a user interface of a user device based on the IoT environment data.

In an embodiment, system 200 may include one or more processors configured for receiving agent user input data 203 corresponding to instructions to perform a task within IoT environment (e.g., IoT system 240), or an IoT device command to be executed by an IoT device within IoT environment (e.g., IoT system 240). For example, once the remote access session 280 is established, second computing device 230 may have restricted access to IoT environment (e.g., IoT system 240) based on the access restrictions, wherein the access restrictions may provide second computing device 230 access to router (e.g., IoT device 201). Further, second computing device 230 may be configured to receive agent user input data 203 (e.g., reset IoT device 201) in the form of instructions to user of first computing device 220 or in the form of a command to be executed by IoT device 201. Furthermore, agent user input data 230 may be transmitted to first computing device 220 and/or to IoT system 240. Further, first computing device 220 may be configured to process agent user input data 203 and present the instructions within the user interface of first computing device 220. Further, IoT system 240 may be configured to process agent user input data 203 and execute the command by IoT device 201.

In an embodiment, system 200 may include one or more processors configured for permitting resolution personnel comprising a plurality of agent technicians to participate the troubleshooting problem, wherein agent technician activity may be recorded. Further, if a first agent technician is tasked to perform a pre-requisite action before a second agent technician, then the one or more processors may be configured to determine when the pre-requisite action is complete to notify and allow the second agent technician to perform the following action. Therefore, agent technician actions may be recorded, and dependent technician data packets may be updated to have additional access. In an embodiment, if an agent technician requires additional access to perform an action or task, then the one or more processors may be configured to request (e.g., in VR view) the additional access using body gestures or using natural language utterances. For example, the additional access request may be analysed and shared to the respective agent technicians to elevate the required access. Once the IoT device owner provides the requested additional access permission, the restriction data packet may be overwritten to reflect the additional access granted. In an embodiment, For problems that need observation by an agent technician after resolution of the problem, the owner can define the time lapse to auto void the requisition data packet after the defined time. In an embodiment, system 200 may be configured to mature based on the historical analysis of various restriction rules and associated approvals from different departments to speed up the problem resolution turnaround time.

In an embodiment, system 200 may include one or more processors configured for receiving a user indication to terminate remote access session 280 at any time. For example, at any point in time during remote access session 280, first computing device 220 may be configured to receive user input data indicating the user wants to terminate remote access session 280, wherein the one or more processors may be configured to terminate remote access session immediately or at any time thereafter.

Figure 3:
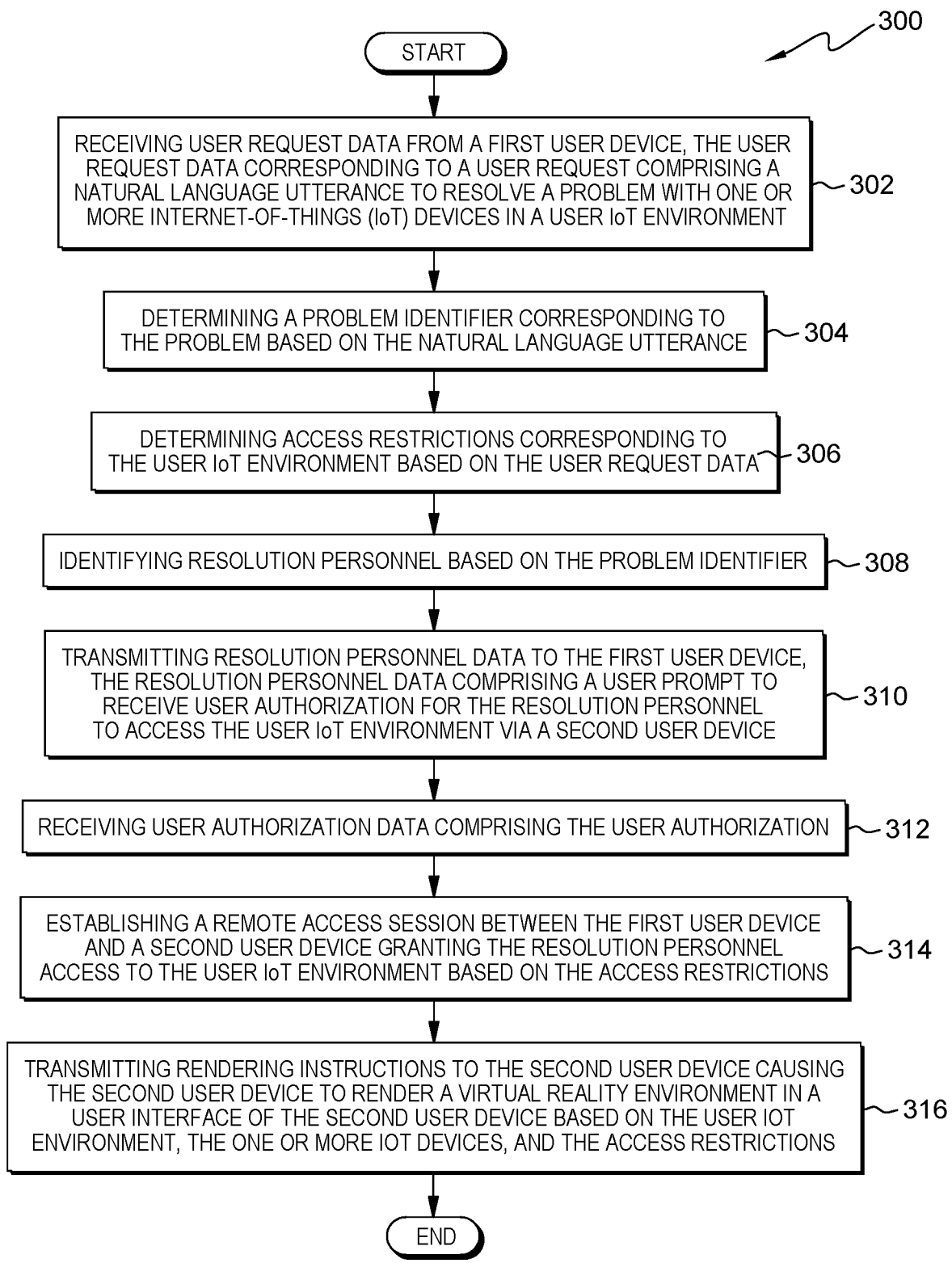
FIG. 3 depicts a flowchart of a computer-implemented method for VR enabled IoT device resolution, in accordance with an embodiment of the present invention.

FIG. 3 depicts a flowchart of computer-implemented method 300 for virtual reality (VR) enabled Internet-of-Things (IoT) device resolution, in accordance with an embodiment of the present invention.

In an embodiment, computer-implemented method 300 may include one or more processors configured for receiving 302 user request data from a first user device, the user request data corresponding to a user request comprising a natural language utterance to resolve a problem with one or more Internet-of-Things (IoT) devices in a user IoT environment.

In an embodiment, computer-implemented method 300 may include one or more processors configured for determining 304 a problem identifier corresponding to the problem based on the natural language utterance. For example, determining 304 the problem identifier may include one or more processors configured for generating model input data comprising the natural language utterance identified in the user request data, transmitting the model input data to a machine learning model, and processing, by the machine learning model, the model input data to generate model output data corresponding to the problem identifier. In other embodiments, the problem identifier may be determined using other intent determination techniques wherein a natural language input is processed to generate an output corresponding to an intent.

In an embodiment, computer-implemented method 300 may include one or more processors configured for querying a library of media content using the problem identifier as an input to the query, retrieving a graphical representation of the problem from the library of media content, and transmitting display instructions to the first user device causing the first user device to display the graphical representation of the problem on a user interface of the first user device. For example, a plurality of media content corresponding to IoT devices may be compiled with their associations to problems experienced by IoT devices within an IoT environment. The compilation of the plurality of media content and associated problems may be saved in the library of media content that is accessible by computing devices to assist with identifying a problem in a particular IoT environment. Once retrieved by the computing device, the graphical representation may be configured to display information about the identified problem and/or instructions on how to resolve the problem in a user interface of the computing device.

In an embodiment, computer-implemented method 300 may include one or more processors configured for determining 306 access restrictions corresponding to the user IoT environment based on user request data. For example, determining 306 access restrictions may include one or more processors configured for identifying restriction levels for each of the one or more IoT devices based on the user request data and generating the access restrictions based on the access restrictions levels and the user authorization.

In an embodiment, computer-implemented method 300 may include one or more processors configured for identifying 308 resolution personnel based on the problem identifier. In an embodiment, the one or more processors may be configured to identify one or more keywords in the problem identifier that correspond to resolution personnel including one or more agent technicians associated with a second user device. For example, the problem identifier may include "router internet connectivity" keywords, wherein an internet router technician or router connectivity support technician is an agent technician that corresponds to the problem identifier. Thus, the resolution personnel may be identified as an internet router technician based on the problem identifier including the keywords "router internet connectivity."

In an embodiment, computer-implemented method 300 may include one or more processors configured for determining that the resolution personnel may include a plurality of technicians to resolve a plurality of aspects of the problem based on the problem identifier and determining role-based restrictions for each of the plurality of technicians based on the plurality of aspects of the problem and their corresponding access restrictions.

In an embodiment, computer-implemented method 300 may include one or more processors configured for transmitting 310 resolution personnel data to the first user device, the resolution personnel data comprising a user prompt to receive user authorization for the resolution personnel to access the user IoT environment via a second user device. Once the resolution personnel is identified, the one or more processors may be configured for generating resolution personnel data comprising the user prompt to receive user authorization for the identified resolution personnel to access the user IoT environment via the second user device.

In an embodiment, computer-implemented method 300 may include one or more processors configured for receiving 312 user authorization data comprising the user authorization. For example, first user device may be configured to receive the resolution personnel data, process the resolution personnel data, and present the user prompt to the user in a user interface of first user device, wherein the user interface of first user device may be configured to receive the user authorization. In an embodiment, the user authorization may be transmitted to second user device as user authorization data.

In an embodiment, receiving 312 user authorization data may further include one or more processors configured for receiving user boundary range data corresponding to user body movement gestures defining an approval list of the one or more IoT devices that the user grants access to the resolution personnel. Further, receiving 312 user authorization data may further include one or more processors configured for generating the user authorization data based on the user boundary range data.

In an embodiment, computer-implemented method 300 may include one or more processors configured for establishing 314 a remote access session between the first user device and the second user device granting the resolution personnel access to the user IoT environment based on the access restrictions. For example, responsive to receiving the user authorization data, the one or more processors may be configured to establish the remote access session by opening a communication channel between the first user device and the second user device, wherein the communication channel is configured to grant the resolution personnel access based on the access restrictions to the IoT device associated with the problem in the user IoT environment.

In an embodiment, computer-implemented method 300 may include one or more processors configured for transmitting 316 rendering instructions to the second user device causing the second user device to render a remote virtual reality (VR) environment in a user interface of the second user device based on the user IoT environment, the one or more IoT devices, and the access restrictions.

In an embodiment, responsive to receiving a user indication to terminate the remote access session, computer-implemented method 300 may include one or more processors configured for terminating the remote access session.

In an embodiment, computer-implemented method 300 may include one or more processors configured for receiving user define data from the first user device corresponding to a user request to define an image-based security repository, generating an image profile corresponding to the user request to resolve the problem comprising one or more of the problem identifier, the access restrictions, the resolution personnel, and the user authorization, and publishing the image profile to a database based on one or more publication settings.

Figure 4:
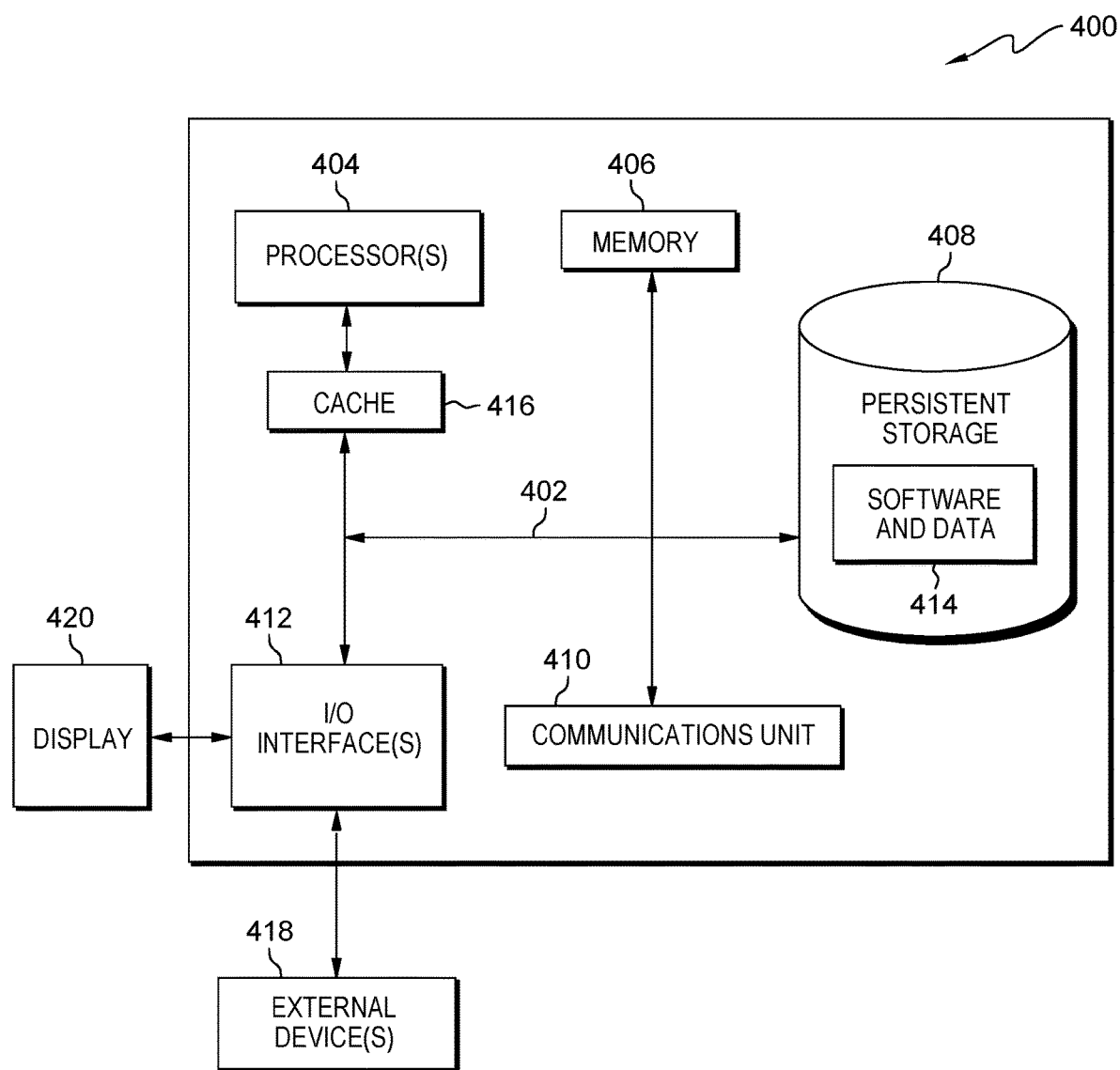
FIG. 4 depicts a block diagram of a computing device of distributed data processing environment of FIG. 1, in accordance with an embodiment of the present invention.

FIG. 4 depicts a block diagram of a computing device of distributed data processing environment of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Software and data 414 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 414 may be downloaded to persistent storage 408 through communications unit 410.

I/O interface(s) 412 allows for input and output of data with other devices that may be connected to database 124, server 125, user device 120, virtual reality headset 121, VR controller 123, user device 130, virtual reality headset 131, and VR controller 133. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data 414 used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor or an incorporated display screen, such as is used, for example, in tablet computers and smart phones.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
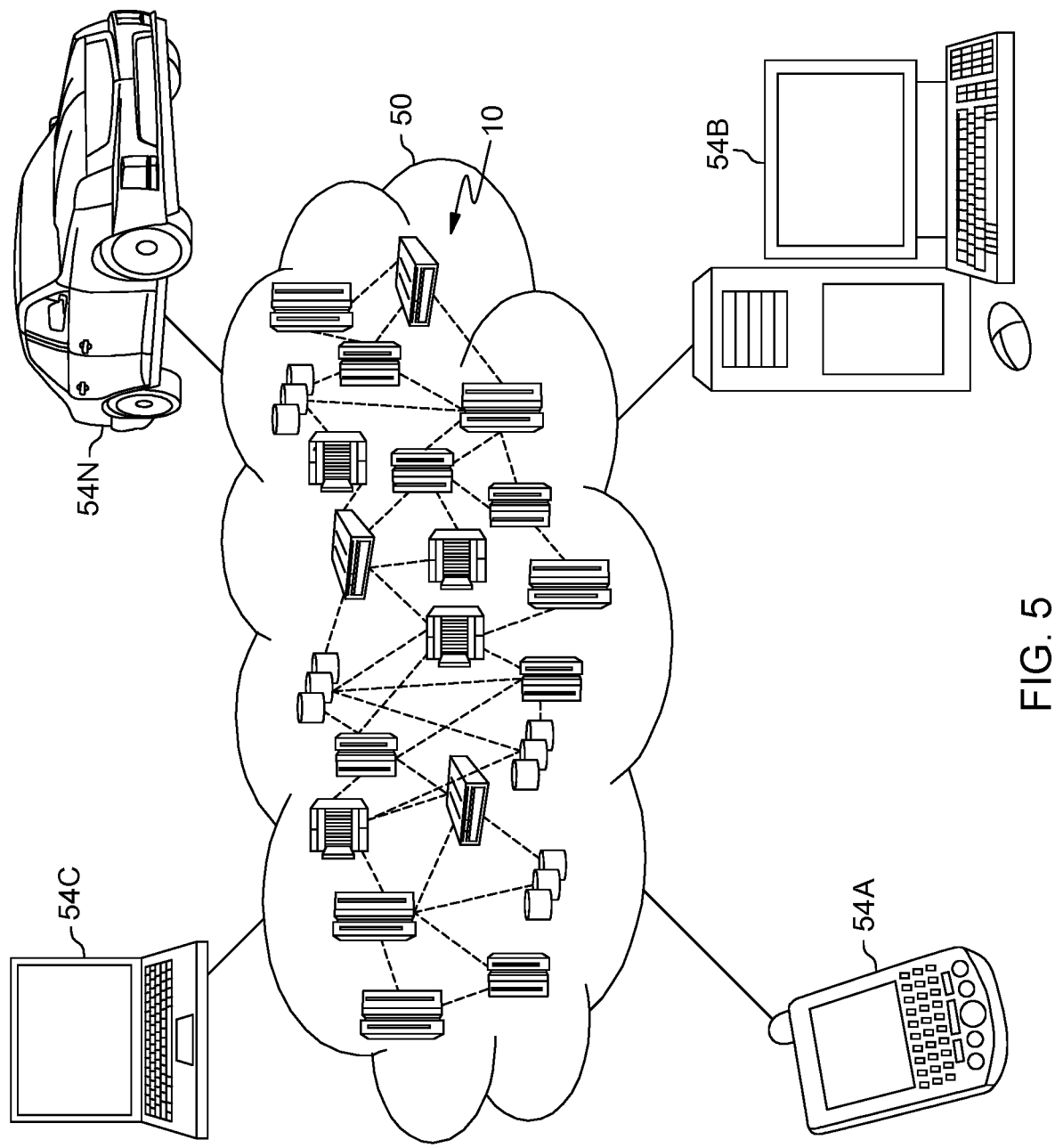
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser). In various embodiments, cloud computing node 10 is a computer system including components and capabilities as discussed with respect to FIG. 4.

Figure 6:
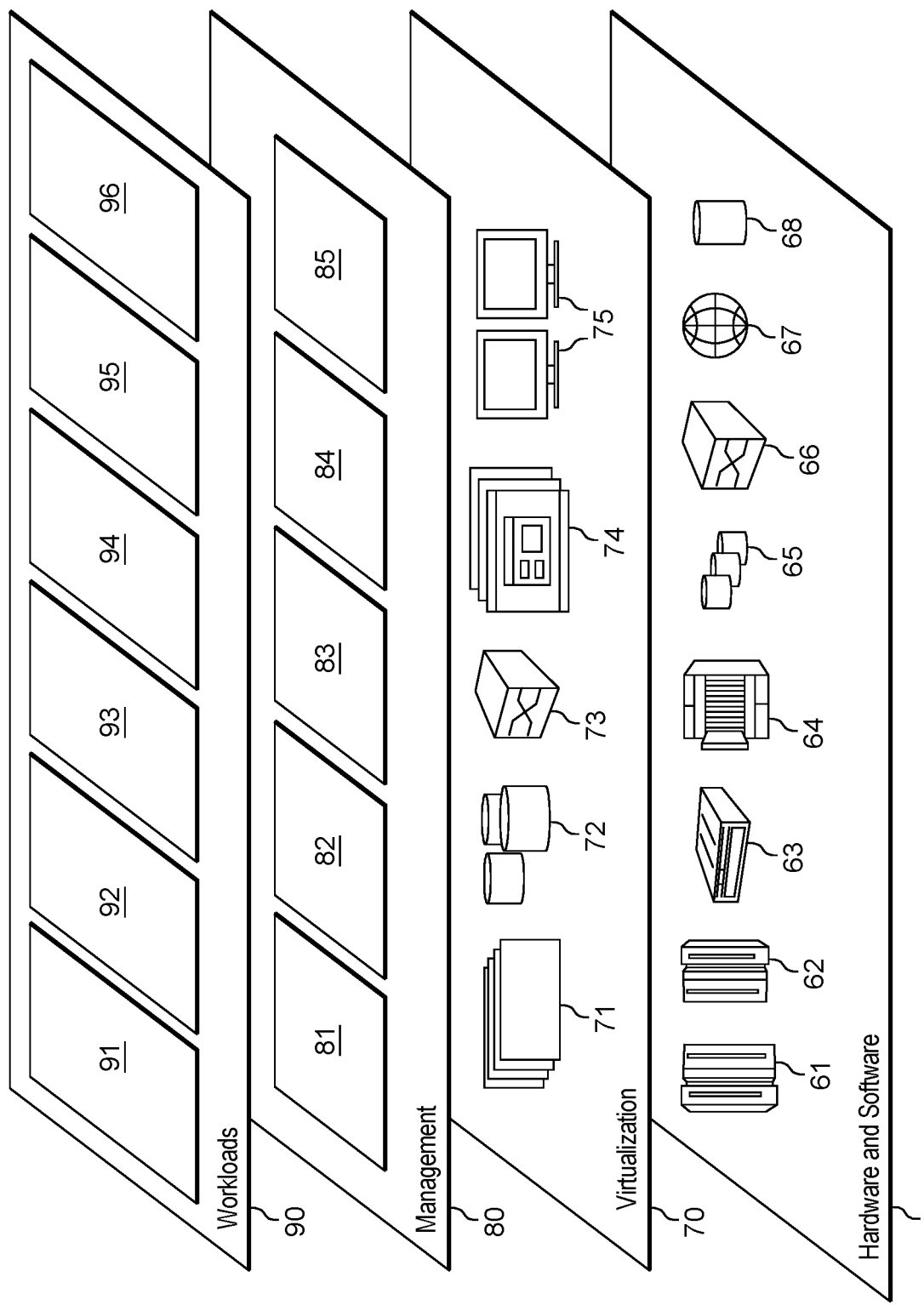
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and shopping assist program 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
receiving, by one or more processors, user request data from a first user device comprising a virtual reality (VR) headset worn by a user, the user request data corresponding to a user request comprising a natural language utterance, received by the VR headset worn by the user, to resolve a problem with one or more Internet-of-Things (IoT) devices included in a plurality of IoT devices in a user IoT environment;
determining, by one or more processors, a problem identifier corresponding to the problem based on the natural language utterance;
determining, by one or more processors, access restrictions corresponding to the user IoT environment based on the user request data;
identifying, by one or more processors, resolution personnel based on the problem identifier;
transmitting, by one or more processors, resolution personnel data to the first user device, the resolution personnel data comprising a user prompt to receive user authorization for the resolution personnel to access the user IoT environment via a second user device;
receiving, by one or more processors, user authorization data comprising the user authorization;
establishing, by one or more processors, a remote access session between the first user device and the second user device granting the resolution personnel access to the user IoT environment based on the access restrictions; and transmitting, by one or more processors, rendering instructions to the second user device causing the second user device to render a remote VR environment in a user interface of the second user device based on the user IoT environment, the one or more IoT devices, and the access restrictions, wherein, once the remote access session is established, the second user device has restricted access to the user IoT environment based on the access restrictions, wherein the restricted access grants the second user device access to the one or more IoT devices in the user IoT environment and denies the second user device access to other ones of the plurality of IoT devices in the user IoT environment.

2. The computer-implemented method of claim 1, wherein determining the problem identifier further comprises:

generating, by one or more processors, model input data comprising the natural language utterance identified in the user request data;

transmitting, by one or more processors, the model input data to a machine learning model; and processing, by the machine learning model, the model input data to generate model output data corresponding to the problem identifier.

3. The computer-implemented method of claim 1, further comprising:

querying, by one or more processors, a library of media content using the problem identifier to identify the problem;

retrieving, by one or more processors, a graphical representation of the problem from the library of media content; and transmitting, by one or more processors, display instructions to the first user device causing the first user device to display the graphical representation of the problem on a user interface of the first user device.

4. The computer-implemented method of claim 1, wherein determining the access restrictions further comprise:

identifying, by one or more processors, respective restriction levels for each of the plurality of IoT devices in the user IoT environment based on the user request data; and generating, by one or more processors, the access restrictions based on the restriction levels and the user authorization.

5. The computer-implemented method of claim 1, wherein receiving the user authorization data further comprises:

receiving, by one or more processors, user boundary range data corresponding to user body movement gestures defining an approval list of the one or more IoT devices that the user grants access to the resolution personnel, wherein the body movement gestures comprise head gestures with the VR headset worn by the user and/or hand gestures with VR controllers held by the user wearing the VR headset; and generating, by one or more processors, the user authorization data based on the user boundary range data.

6. The computer-implemented method of claim 1, further comprising:

receiving, by one or more processors, user define data from the first user device corresponding to a user request to define an image-based security repository;

generating, by one or more processors, an image profile corresponding to the user request to resolve the problem comprising one or more of the problem identifier, the access restrictions, the resolution personnel, and the user authorization; and publishing, by one or more processors, the image profile to a database based on one or more publication settings.

7. The computer-implemented method of claim 1, further comprising:

determining, by one or more processors, that the resolution personnel comprise a plurality of technicians to resolve a plurality of aspects of the problem based on the problem identifier; and determining, by one or more processors, role-based restrictions for each of the plurality of technicians based on the plurality of aspects of the problem and their corresponding access restrictions.

8. A computer program product, the computer program product comprising:

one or more computer readable storage media and program instructions collectively stored on the one or more computer readable storage media, the stored program instructions comprising:

program instructions to receive user request data from a first user device comprising a virtual reality (VR) headset worn by a user, the user request data corresponding to a user request to resolve a problem with one or more Internet-of-Things (IoT) devices included in a plurality of IoT devices in a user IoT environment, wherein the user request comprises a natural language utterance received by the VR headset worn by the user;

program instructions to determine a problem identifier corresponding to the problem based on the natural language utterance;

program instructions to determine access restrictions corresponding to the user IoT environment based on the user request data;

program instructions to identify resolution personnel based on the problem identifier;

program instructions to transmit resolution personnel data to the first user device, the resolution personnel data comprising a user prompt to receive user authorization for the resolution personnel to access the user IoT environment via a second user device;

program instructions to receive user authorization data comprising the user authorization;

program instructions to establish a remote access session between the first user device and the second user device granting the resolution personnel access to the user IoT environment based on the access restrictions; and program instructions to transmit rendering instructions to the second user device to cause the second user device to render a VR environment in a user interface of the second user device based on the user IoT environment, the one or more IoT devices, and the access restrictions, wherein, once the remote access session is established, the second user device has restricted access to the user IoT environment based on the access restrictions, wherein the restricted access grants the second user device access to the IoT device in the user IoT environment and denies the second user device access to other ones of the plurality of IoT devices in the user IoT environment.

9. The computer-program product of claim 8, wherein the program instructions to determine the problem identifier further comprises:
   program instructions to generate model input data comprising the natural language utterance identified in the user request data;
   program instructions to transmit the model input data to a machine learning model; and
   program instructions to process, by the machine learning model, the model input data to generate model output data corresponding to the problem identifier.

10. The computer-program product of claim 8, further comprising:
    program instructions to query a library of media content using the problem identifier to identify the problem;
    program instructions to retrieve a graphical representation of the problem from the library of media content; and
    program instructions to transmit display instructions to the first user device to cause the first user device to display the graphical representation of the problem on a user interface of the first user device.

11. The computer-program product of claim 8, wherein the program instructions to determine the access restrictions further comprise:
    program instructions to identify restriction levels for each of the one or more IoT devices based on the user request data; and
    program instructions to generate the access restrictions based on the restriction levels and the user authorization.

12. The computer-program product of claim 8, wherein the program instructions to receive the user authorization data further comprises:
    program instructions to receive user boundary range data corresponding to user body movement gestures defining an approval list of the one or more IoT devices that the user grants access to the resolution personnel; and
    program instructions to generate the user authorization data based on the user boundary range data.

13. The computer-program product of claim 8, further comprising:
    program instructions to receive user define data from the first user device corresponding to a user request to define an image-based security repository;
    program instructions to generate an image profile corresponding to the user request to resolve the problem comprising one or more of the problem identifier, the access restrictions, the resolution personnel, and the user authorization; and
    program instructions to publish the image profile to a database based on one or more publication settings.

14. The computer-program product of claim 8, further comprising:
    program instructions to determine that the resolution personnel comprise a plurality of technicians to resolve a plurality of aspects of the problem based on the problem identifier; and
    program instructions to determine role-based restrictions for each of the plurality of technicians based on the plurality of aspects of the problem and their corresponding access restrictions.

15. A computer system, comprising:
    one or more computer processors;
    one or more computer readable storage media;
    program instructions stored on the one or more computer readable storage media for execution by at least one of the one or more processors, the program instructions comprising:
    program instructions to receive user request data from a first user device comprising a virtual reality (VR) headset worn by a user, the user request data corresponding to a user request to resolve a problem with one or more Internet-of-Things (IoT) devices included in a plurality of IoT devices in a user IoT environment, wherein the user request comprises a natural language utterance received by the VR headset worn by the user;
    program instructions to determine a problem identifier corresponding to the problem based on the natural language utterance;
    program instructions to determine access restrictions corresponding to the user IoT environment based on the user request data;
    program instructions to identify resolution personnel based on the problem identifier;
    program instructions to transmit resolution personnel data to the first user device, the resolution personnel data comprising a user prompt to receive user authorization for the resolution personnel to access the user IoT environment via a second user device;
    program instructions to receive user authorization data comprising the user authorization;
    program instructions to establish a remote access session between the first user device and the second user device granting the resolution personnel access to the user IoT environment based on the access restrictions; and
    program instructions to transmit rendering instructions to the second user device causing the second user device to render a VR environment in a user interface of the second user device based on the user IoT environment, the one or more IoT devices, and the access restrictions,
    wherein, once the remote access session is established, the second user device has restricted access to the user IoT environment based on the access restrictions, wherein the restricted access grants the second user device access to the IoT device in the user IoT environment and denies the second user device access to other ones of the plurality of IoT devices in the user IoT environment.

16. The computer-system of claim 15, wherein the program instructions to determine the problem identifier further comprises:
    program instructions to generate model input data comprising the natural language utterance identified in the user request data;
    program instructions to transmit the model input data to a machine learning model; and
    program instructions to process, by the machine learning model, the model input data to generate model output data corresponding to the problem identifier.

17. The computer-system of claim 15, further comprising:
    program instructions to query a library of media content using the problem identifier to identify the problem;
    program instructions to retrieve a graphical representation of the problem from the library of media content;
    program instructions to transmit display instructions to the first user device causing the first user device to display the graphical representation of the problem on a user interface of the first user device;

program instructions to determine that the resolution personnel comprise a plurality of technicians to resolve a plurality of aspects of the problem based on the problem identifier; and program instructions to determine role-based restrictions for each of the plurality of technicians based on the plurality of aspects of the problem and their corresponding access restrictions.

18. The computer-system of claim 15, wherein the program instructions to determine the access restrictions further comprise:

program instructions to identify restriction levels for each of the one or more IoT devices based on the user request data; and program instructions to generate the access restrictions based on the restriction levels and the user authorization.

19. The computer-system of claim 15, wherein the program instructions to receive the user authorization data further comprises:

program instructions to receive user boundary range data corresponding to user body movement gestures defining an approval list of the one or more IoT devices that the user grants access to the resolution personnel; and program instructions to generate the user authorization data based on the user boundary range data.

20. The computer-system of claim 15, further comprising:

program instructions to receive user define data from the first user device corresponding to a user request to define an image-based security repository;

program instructions to generate an image profile corresponding to the user request to resolve the problem comprising one or more of the problem identifier, the access restrictions, the resolution personnel, and the user authorization; and program instructions to publish the image profile to a database based on one or more publication settings.

* * * * *